Aug. 22, 1939.  J. W. RUSH  2,170,250
BRAKE CONTROL MEANS
Filed Oct. 7, 1937
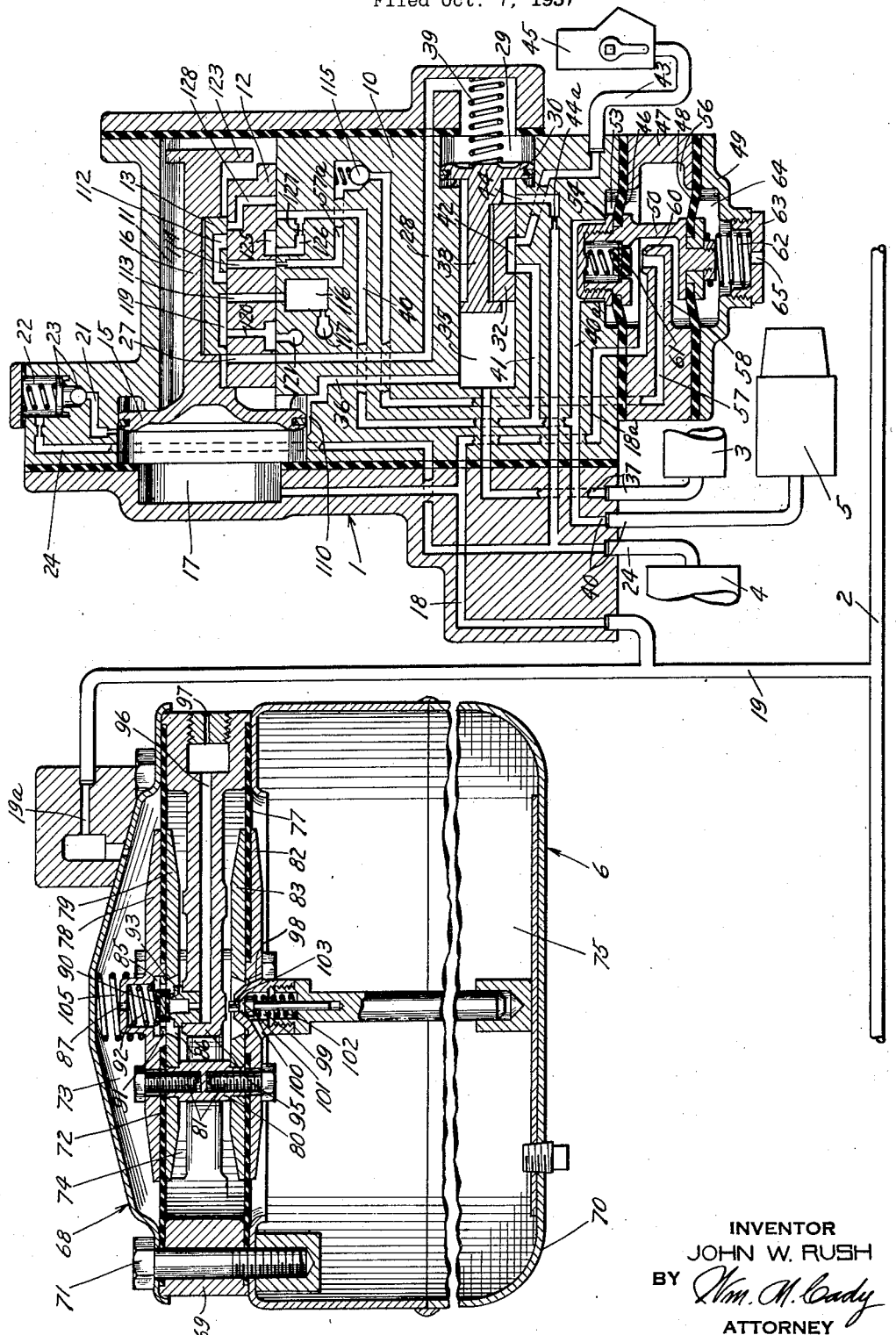
INVENTOR
JOHN W. RUSH
BY Wm. M. Cady
ATTORNEY Patented Aug. 22, 1939

2,170,250

UNITED STATES PATENT OFFICE 2,170,250

BRAKE CONTROL MEANS

John W. Rush, Wilkinsburg, Pa., assignor to The Westinghouse Air Brake Company, Wilmerding, Pa., a corporation of Pennsylvania Application October 7, 1937, Serial No. 167,734

3 Claims. (Cl. 303—83)

This invention relates to automatic fluid pressure brake equipments, and more particularly to brake controlling valve devices embodying means for effecting serial quick service action.

In Patent Number 2,152,257, issued March 28, 1939 to Ellis E. Hewitt and Donald L. McNeal by the United States Patent Office, there is disclosed a brake equipment designed primarily for high speed passenger trains of the articulated car type, the equipment including a brake controlling valve device having quick service means for locally venting air from the brake pipe in several stages in order to effect rapid propagation of the reduction in brake pipe pressure when effecting an initial application of the brakes, and graduated release means for effecting the release of the brakes by degrees or steps, together with a combined quick service limiting and cut-off valve means which is operative upon a predetermined build-up in brake cylinder pressure to close the single communication through which air is vented from the brake pipe by the quick service means. As explained in the above patent, the quick service communication is thus closed not only to limit quick service venting in response to an initial reduction in brake pipe pressure, but also to avoid undesired quick service activity of the controlling valve device during a graduated release of the brakes. Accordingly, after a service application of the brakes has been effected and the brake cylinder pressure has been increased above the predetermined value, usually between ten and fourteen pounds per square inch, the limiting valve means referred to becomes effective to prevent functioning of the quick service means in any stage during a subsequent application or reapplication of the brakes.

Under certain railway traffic conditions, however, it may be desirable to run passenger trains made up of cars having the above type of brake equipment together with cars of the type employing the well known universal valve equipment, which is provided with quick service means adapted to function in response to each reduction in brake pipe pressure and regardless of brake cylinder pressure. In controlling passenger trains of this type, which may include twenty-four cars or more, an application of the brakes is generally made in steps or graduations in order to bring the train to a smooth stop. The last stages of a graduated reduction in brake pipe pressure are usually effected when the pressure of fluid in the brake cylinders is greater than the predetermined pressure of ten to fourteen pounds above mentioned, and it will thus be apparent that unless the brake controlling valve devices of the type disclosed in the aforementioned patent are provided with independent means whereby quick service activity is made available during each reduction in brake pipe pressure, it may be difficult to effect a graduated and uniform application of the brakes on cars in the mixed train with maximum rapidity.

One object of my invention is to provide an auxiliary quick service vent valve device adapted to be associated with a brake controlling valve device embodying an automatically limited quick service feature, which vent valve device is adapted to be separately mounted and is operative independently of the brake controlling valve device.

A further object of the invention is to provide an auxiliary quick service device of the above type adapted to operate on an initial reduction in brake pipe pressure simultaneously with the automatically limited quick service venting effected by the brake controlling valve device, so as to cause maximum quick service venting on the first reduction, and reduced venting on successive reductions in brake pipe pressure.

Another object of my invention is to provide, in combination with a brake controlling valve device having quick service means which is adapted to be cut out of action upon a predetermined increase in brake cylinder pressure, quick service vent valve means operative upon a reduction in brake pipe pressure to effect a quick service venting of fluid from the brake pipe regardless of the pressure of fluid in the brake cylinder.

Other objects and advantages of the invention will appear in the following more detailed description thereof, taken in connection with the accompanying drawing, wherein the single figure is a diagrammatic sectional view of fluid pressure brake apparatus embodying my invention.

As shown in the drawing, the apparatus includes a brake controlling valve device 1, a brake pipe 2, an auxiliary reservoir 3, a supplementary reservoir 4, a brake cylinder 5, and an auxiliary quick service vent valve device 6. For the purpose of illustration, the brake controlling valve device 1 is shown in simplified form, it being understood that this device may be similar to the service portion of the brake controlling valve device disclosed in the patent already mentioned. It should also be understood that the apparatus may include a suitable relay valve device, not shown, for cooperating with the brake controlling valve device to supply fluid under pressure to the brake cylinder.

In the simplified form shown in the drawing, the brake controlling valve device 1 comprises a main casing section 10 having formed therein a slide valve chamber 11 containing a service slide valve 12 and a graduating slide valve 13, both of which are adapted to be operated by a service piston 15 through the medium of a stem 16. The piston 15 is subject on one side to the pressure of fluid to the valve chamber 11, and has on the opposite side a chamber 17 which communicates by way of a passage 18 and a branch pipe 19 with the brake pipe 2. With the piston 15 in the release position as shown in the drawing, the piston chamber 17 communicates through a feed passage 21, a chamber 22 containing a pair of check valves 23, and a passage and pipe 24 with the supplementary reservoir 4. With the service slide valve 12 likewise in release position, the valve chamber 11 communicates through a port 27 in the slide valve and a passage 28 in the casing with a piston chamber 29 formed in the casing section 10 and having mounted therein a release piston 30.

The release piston 30 is adapted to operate a release slide valve 32 through the medium of a stem 33 in graduating the release of the brakes as hereinafter explained. The release slide valve 32 is disposed in a valve chamber 35 which is connected by way of a passage 36 to the slide valve chamber 11, and by way of a passage and pipe 37 to the auxiliary reservoir 3. A spring 39 is interposed between the release piston 30 and the wall of the chamber 29 for urging the piston and slide valve to the release position as shown in the drawing. With the release slide valve 32 in this position, the brake cylinder 5 is connected to atmosphere by way of a pipe and passage 40, a passage 41, a cavity 42 in the release slide valve, an exhaust passage and pipe 43, and the usual retainer valve device 45, while the valve chamber 35 is in communication by way of a passage 44 and the passage and pipe 24 with the supplementary reservoir 4.

The retainer valve device 45 may be of any desired type, and is adapted to be adjusted for retaining a certain fluid pressure in the brake cylinder when the brakes on the train are released to effect recharging of the brake pipe during cycling operation of the brakes in controlling the descent of the train down a long grade.

The brake controlling valve device 1 is provided with a combined quick service limiting and cut-off valve mechanism which is adapted to control the quick service functioning of the service and auxiliary slide valves 12 and 13, and which comprises a flexible diaphragm 46 interposed between the casing section 10 and a casing section 47, a similar diaphragm 48 clamped between the casing section 47 and a cover plate 49, and a follower member 50 which is disposed between and is suitably secured to both of said diaphragms. Formed at the upper side of the diaphragm 46 is a chamber 53 which communicates through a passage 40a and the passage and pipe 40 with the brake cylinder 5, the chamber 53 being adapted to receive the upper portion of the follower member 50 which is engageable with an annular shoulder 54 provided on the casing for limiting upward movement of the follower member and the associated diaphragms. Between the diaphragms 46 and 48 is formed a chamber 56 which communicates through a passage 18a with the passage 18 leading from the brake pipe 2, the chamber 56 being also adapted to communicate with a quick service passage 57 which is formed in a portion 58 of the casing section 47 extending into said chamber.

The portion 58 carries an annular valve seat 60 which is adapted to be engaged by a spring weighted valve 61 that is operatively mounted in the upper portion of the follower member 50, the valve 61 being normally maintained in unseated position by the force of a spring 62 which is interposed between the lower end of the follower member 50 and a cap 63 and acts to urge the follower member upwardly into engagement with the shoulder 54 as shown in the drawing. It will be noted that a chamber 64 formed at the lower side of the diaphragm 48 is connected through an opening 65 in the cap 63 to the atmosphere.

The auxiliary quick service vent valve device 6 comprises casing sections 68, 69, and 70, which may be secured together by suitable means such as the bolt 71. The casing sections 68 and 69 have mounted therebetween a flexible diaphragm 72, having formed at the upper side thereof a chamber 73 and at the lower side a chamber 74, which is separated from a chamber 75 formed in the casing section 70 by a flexible diaphragm 77 that is clamped between the casing sections 69 and 70. The central portion of the diaphragm 72 is clamped between follower members 78 and 79, which are rigidly secured by suitable means such as a strut 80 and bolts 81 to a pair of follower members 82 and 83 engaging opposite sides of the diaphragm 77.

The follower member 78 is provided with a central recess 85 which communicates through an opening 86 in the follower member 79 with the chamber 74 between the diaphragms, and by way of an aperture 87 with the upper chamber 73, which is in turn connected through a passage 19a with the pipe 19 leading to the brake pipe 2. Contained in the recess 85 is a valve element 90 having an apertured collar 91, which valve is biased downwardly by a spring 92 and is adapted to engage an annular seat 93 provided on an interior arm portion 95 extending into the chamber 74. The valve element 90 is adapted to be lifted from the seat 93 on operative engagement of the follower 79 with the collar 91, and controls communication from the connected chambers 73 and 74 to the atmosphere by way of a passage 96 and a restricted orifice 97.

The chamber 74 communicates through a restricted passage 98 formed in the follower member 82 with the chamber 75, and in addition the follower member has a valve chamber 99 formed therein containing a valve 101, which is urged toward seated position by a spring 102 disposed in the valve chamber and controls a larger communication 100 between chambers 74 and 75. The valve 101 has a stem 103 which extends through a suitable bore in the follower member 82 into the chamber 74, and which stem is engageable with the lower face of the portion 95 of the casing for effecting the unseating of the valve 101 when the diaphragm assembly is moved upwardly in a manner hereinafter explained. A spring 105 is interposed between the casing section 68 and the follower member 78 in the upper chamber 73, for urging the diaphragm assembly into the position shown in the drawing, both the valves 90 and 101 being thereby maintained in seated position.

In conditioning the brake apparatus for operation, fluid under pressure supplied in the usual manner to the brake pipe 2 flows therefrom through the passage 18 in the brake controlling valve device 1 to the piston chamber 17, moving the piston 15 and the service and auxiliary slide valves 12 and 13 to release position as shown in the drawing. With the service piston 15 in release position, fluid under pressure is supplied from the chamber 17 through the usual feed groove 110 to the slide valve chamber 11, and thence through the passage 36, the chamber 35, and passage and pipe 37 to the auxiliary reservoir 3. At the same time fluid under pressure is supplied from the piston chamber 17 through the passage 21, past the check valves 23, and through the chamber 22 and the passage and pipe 24 to the supplementary reservoir 4. Fluid under pressure also flows from the slide valve chamber 11 by way of the port 27 in the service slide valve 12 and the passage 28 to the piston chamber 29. Since the fluid pressures acting on opposite sides of the release piston 30 are thus equal, the spring 39 maintains the release piston and slide valve 32 in the position shown in the drawing. With the release slide valve 32 in this position, the brake cylinder 5 and the diaphragm chamber 53 are connected with the atmosphere by way of the passages 40 and 40a, respectively, the passage 41, the cavity 42, passage and pipe 43 and the retainer valve device 45.

It will be noted that fluid at the pressure maintained at the brake pipe is supplied from the passage 18 through the passage 18a to the chamber 56 between the diaphragms 46 and 48, and that the quick service limiting and cut-off valve 61 is at this time maintained unseated by the force of the spring 62 acting through the medium of the follower member 50.

Fluid under pressure supplied from the brake pipe 2 to the pipe 19 also flows therefrom through the passage 19a in the auxiliary quick service valve device 6 into the chamber 73, and flows therefrom through the passage 87, the recess 85, and the opening 86 to the intermediate chamber 74, from which fluid under pressure is supplied through the restricted passage 98 to the chamber 75.

When the pressure of fluid in the brake pipe 2 is reduced initially in effecting an application of the brakes, the corresponding reduction in fluid pressure in the service piston chamber 17 of the brake controlling valve device causes the piston 15 to be moved to the left by the pressure of fluid in the valve chamber 11, the auxiliary slide valve 13 being thereby moved through the medium of the stem 16 to quick service position, while the service slide valve 12 remains positioned as shown in the drawing. On movement of the auxiliary slide valve 13 to quick service position, a cavity 112 therein registers with ports 113 and 114 in the service slide valve 12, and fluid under pressure is then locally vented from the brake pipe 2 by way of the pipe 19, the passage 18, the passage 18a, past the unseated valve 61, through the passage 57, past a spring weighted check valve 115, through a passage 57a, and thence by way of the port 114, cavity 112, and port 113 to a quick service bulb 116, which communicates with a restricted atmospheric exhaust port 117. This initial venting of fluid under pressure from the brake pipe to the bulb 116 and the atmospheric port 117 is, according to my invention, supplemented by a limited venting of brake pipe fluid effected substantially at the same time by operation of the auxiliary quick service valve device 6.

Referring to the auxiliary quick service valve device 6, upon the initial reduction in the pressure of the fluid in the brake pipe and in the branch pipe 19 just described, the pressure of fluid in the connected chambers 74 and 73 quickly falls below the pressure of fluid in the chamber 75, which at this time communicates with the chamber 74 only through the restricted passage 96, and as a result the interlocked diaphragms 77 and 72 are moved upwardly. As the diaphragms are thus moved, the valve 90 is lifted away from the seat 93, so that fluid under pressure is vented from the brake pipe 2 by way of the pipe 19, the chamber 73, recess 85, past the unseated valve, and thence through the passages 96 and 97 to the atmosphere, and thus effecting a local reduction in brake pipe pressure augmenting that caused by initial operation of the brake controlling valve device 1 previously described.

As the diaphragms 77 and 72 are moved upwardly, the stem 103 of the valve 101 is brought into engagement with the lower face of the portion 95, so that the valve is held stationary to permit continued movement of the follower member 83 out of seating engagement therewith, with the result that fluid under pressure is vented to atmosphere from the chamber 75 through the large passage 100 and past the unseated valve, and thence through the chamber 74, passage 96 and the restricted orifice 97. Since the volume of the chamber 75 is relatively small, the pressure of fluid therein will quickly equalize with the brake pipe pressure acting in the connected chambers 74 and 73, thereby permitting the spring 105 to shift the diaphragm assembly downwardly so as to seat the valves 99 and 101.

Referring again to the brake controlling valve device 1, when the service piston 15 and the auxiliary slide valve 13 are moved to quick service position in response to the initial reduction in brake pipe pressure as hereinbefore explained, fluid under pressure is vented to the atmosphere from the release piston chamber 29 by way of the passage 28, the port 27 in the service slide valve 12, a cavity 119 in the auxiliary slide valve, a port 120 in the service slide valve and an atmospheric exhaust port 121, and the auxiliary reservoir pressure acting in the chamber 35 thus becomes effective to overcome the force of spring 39 and causes movement of the release piston 30 and the release slide valve 32 toward the righthand, thereby cutting off the communication between the brake cylinder passage 41 and the atmosphere, and also lapping the supplementary reservoir passage 44.

Meanwhile, the initial reduction in the pressure of fluid in the brake pipe and consequently in the service piston chamber 17, as augmented by the local quick service venting caused by operation of the auxiliary slide valve 13 and by the auxiliary quick service valve device 6, effects continued movement of the service piston 15 and the stem 16 toward the left-hand, the lug 123 on the end of the stem being thereby brought into engagement with the service slide valve 12, which is then shifted together with the auxiliary slide valve 13 into service position. On movement of the slide valves to the service position, the communication from the quick service passage 57a to the bulb 116 is cut off, while a cavity 125 in the service slide valve establishes communication between the passage 57a and a passage 126 which communicates with the brake cylinder passage 40 through a restricted passage 127. Fluid under pressure is then vented from the brake pipe 2 through the pipe 19, the passage 18, the passage 18a, past the unseated valve 61, through passage 57, past the ball check valve 115, and thence by way of passages 57a, 125, and 40 to the brake cylinder 5.

The quick service activity of the brake controlling valve device 1 is thus completed in three stages; the first stage being the venting of brake pipe fluid to the bulb 116 to propagate the reduction in brake pipe pressure throughout the train, the second stage being the slow venting by way of the restricted port 117 to dampen undesired surging of brake pipe pressure and to aid movement of the slide valves to service position, while the final stage of quick service venting is adapted to insure maintenance of the slide valves in the service position long enough to permit build up of pressure in the brake cylinder at least to a predetermined value and further to dampen surging of brake pipe pressure.

At the same time, on movement of the service slide valve 12 into service position, communication is established from the slide valve chamber 11 through a service port 128 in the slide valve to the brake cylinder passage 40, so that fluid under pressure is thereby supplied from the auxiliary reservoir 3 to the brake cylinder 5 for effecting a service application of the brakes.

When the pressure of fluid in the brake cylinder 5 and in the diaphragm chamber 53 connected thereto is built up to the value at which the quick service limiting valve mechanism is adapted to operate, the diaphragm 46 and the associated follower member 50 and diaphragm 48 are moved downwardly against the force of spring 62 until the limiting valve 61 engages the seat 60. Further quick service venting of fluid under pressure from the brake pipe to the brake cylinder is thereby cut off.

It is customary for the engineer of a passenger train to effect the service application of the brakes in several steps, which he does by operating his brake valve to reduce brake pipe pressure in two or more stages. It will be understood that when the initial stage of reduction in brake pipe pressure has been completed and the engineer's brake valve device, not shown in the drawing, has been moved temporarily to lap position, further reduction in the fluid pressure in the piston chamber 17 of the brake controlling valve device is checked. When the pressure of fluid in the auxiliary reservoir 3 and in the slide valve chamber 11 connected thereto has then been reduced, by flow of fluid to the brake cylinder, to a value slightly below the fluid pressure in the piston chamber 17, the service piston 15 and the auxiliary slide valve 13 are again shifted to the right until the auxiliary slide valve laps the service port 128 in the service slide valve 12, which remains stationary.

When the pressure of fluid in the brake pipe is then further reduced in order to effect another stage in the service application of the brakes, the service piston 15 is again operated to shift the auxiliary slide valve 13 relative to the service slide valve 12 into the service position, thereby uncovering the service port 128 for permitting a further supply of fluid under pressure from the auxiliary reservoir 3 to the brake cylinder 5. It will be noted, however, that at this time the quick service venting of fluid under pressure from the brake pipe to the brake cylinder is not effected by the brake controlling valve device 1, since the quick service limiting valve 61 has been positioned to cut off communication between the brake pipe passage 18a and the quick service passage 57 as hereinbefore explained.

The desired function of local quick service venting of fluid under pressure from the brake pipe is, nevertheless, provided by reason of the repeated operation of my auxiliary quick service valve device 6 in response to the second stage of reduction in brake pipe pressure, the connected diaphragms 72 and 77 being again operated to unseat the valves 90 and 101 to effect another limited local reduction in brake pipe pressure, as already described.

It will thus be apparent that, in addition to the quick service means in the brake controlling valve device 1 operative on an initial reduction in the pressure of fluid in the brake pipe to vent fluid therefrom in first and second stages to the bulb 116 and the restricted atmospheric port 117 and in a final stage to vent fluid from the brake pipe through the passage 40 to the brake cylinder 5, which means is controlled by the limiting valve 61, there is provided a separate auxiliary quick service venting valve means operative to discharge a limited amount of fluid under pressure from the brake pipe simultaneously with the said first stage of brake pipe venting, the auxiliary device being thus adapted to provide a so-called continuous or always available quick service function each time the brake pipe pressure is reduced, as in effecting a graduated application of the brakes or in cycling on a grade.

When it is desired to effect the release of the brakes, fluid under pressure is supplied to the brake pipe 2 by operation of the usual engineer's brake valve device, not shown, and upon the consequent increase in fluid pressure in the chamber 17 of the brake controlling valve device, the service piston 15 is operated to move the service and auxiliary slide valves 12 and 13 to the release position as shown in the drawing.

Fluid under pressure then flows from the chamber 11 through the port 27 in the service slide valve and the passage 28 to the release piston chamber 29, and with the fluid pressure on opposite sides of the release piston 30 thereby equalized, the spring 39 moves the release piston and the release slide valve 32 to the left, establishing communication from the brake cylinder 5 to the atmosphere by way of the pipe and passage 40, the passage 41, the cavity 42, the port 43 and the retainer valve device 45.

In so moving, the slide valve 32 also uncovers the passage 44, so that fluid under pressure is supplied from the supplementary reservoir 4 through the passage, at a rate determined by a restricted portion 44a of said passage, to the chamber 35 and thence to the auxiliary reservoir 3, thereby aiding the initial recharging of the auxiliary reservoir to permit quicker build-up in brake pipe pressure throughout the train.

If it is desired to graduate the release of the brakes, the brake valve device (not shown) may be returned to lap position after brake pipe pressure has been partially restored in effecting the initial release of the brakes, thus checking further increase in brake pipe pressure. Continued flow of fluid under pressure from the supplementary reservoir 4 then increases the auxiliary reservoir pressure acting in the chamber 11 so as to move the service piston 15 and graduating slide valve 13 to the left into graduated release lap position, wherein the cavity 119 connects ports 27 and 128 in the release slide valve, so that fluid under pressure is again exhausted from the release piston chamber 29 and the release piston 30 and valve 32 are once more shifted to the right, lapping the passages 41 and 44. Fluid at reduced pressure is thus retained in the brake cylinder 5 for a desired interval, after which a further graduation in the release of the brakes may be effected.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake apparatus, in combination, a brake pipe, a brake cylinder, a brake controlling valve device comprising valve means operative in service position to control the supply of fluid under pressure to the brake cylinder and including quick service means functioning in response to an initial reduction in brake pipe pressure to vent fluid under pressure from said brake pipe through a quick service communication to a bulb having a restricted atmospheric port and then to vent fluid under pressure from said brake pipe through said communication to the brake cylinder, means adapted to be operated to effect the graduated release of the brakes, and quick service cut-off valve mechanism operative upon a predetermined increase in the pressure of fluid in the brake cylinder to close said quick service communication for insuring against undesired quick service action of said quick service means during a graduated release of the brakes, and an auxiliary quick service valve device separate from said quick service means in the brake controlling valve device and operative independently of said means, said auxiliary device being responsive to any and every reduction in the pressure of fluid in said brake pipe for locally venting fluid therefrom to insure prompt movement of the brake controlling valve device to service position, said auxiliary quick service valve device cooperating with the first-named quick service means for effecting a greater initial quick service reduction in brake pipe pressure than is effected upon subsequent reductions.

2. In a fluid pressure brake equipment of the class including a brake pipe and a control valve device operative on a reduction in brake pipe pressure to effect an application of the brakes, a quick service valve device therefor comprising a casing having a brake pipe chamber connected with the brake pipe, and a control chamber, a pair of movable abutments mounted in said casing and defining an intermediate chamber having restricted communication with said brake pipe chamber and said control chamber, one of said abutments being subject to fluid pressure in said brake pipe chamber and the other abutment being subject to fluid pressure in said control chamber, a normally seated valve carried by the first-named abutment and operative by slight movement thereof under the pressure of fluid in said control chamber, upon initial reduction in brake pipe pressure, to establish communication from said intermediate chamber and consequently from the brake pipe to the atmosphere, and a normally seated valve carried by said other abutment and operative upon a predetermined movement thereof, after unseating of the first-named valve, to vent fluid under pressure from said control chamber to reestablish equalization of the fluid pressures acting on said abutments for limiting the quick service discharge of fluid under pressure from the brake pipe.

3. In a fluid pressure brake apparatus of the class including a brake pipe normally charged with fluid under pressure, a brake controlling valve device operable in response to reductions in brake pipe pressure for effecting application of the brakes, a main quick service means operable by said brake controlling valve device upon an initial reduction in brake pipe pressure for venting fluid locally from the brake pipe and cut-off valve means operative when the brakes are applied to a given degree for rendering said quick service means ineffective to vent fluid from the brake pipe; the combination therewith of an auxiliary quick service device responsive to each reduction in brake pipe pressure in the same brake application to vent fluid locally from the brake pipe, said auxiliary quick service valve device being adapted to cooperate with said main quick service means for effecting a greater initial quick service reduction in brake pipe pressure during the first stage of a graduated application of the brakes than that effected upon succeeding reductions in said pressure.

JOHN W. RUSH.